(12) United States Patent
Schroeder et al.

(10) Patent No.: US 9,267,089 B2
(45) Date of Patent: Feb. 23, 2016

(54) PORTABLE CAMPFIRE

(76) Inventors: John Keith Schroeder, Valparaiso, IN (US); James W. Schroeder, Valparaiso, IN (US)

( * ) Notice: Subject to any disclaimer, the term of this patent is extended or adjusted under 35 U.S.C. 154(b) by 806 days.

(21) Appl. No.: 13/489,419

(22) Filed: Jun. 5, 2012

(65) Prior Publication Data

US 2013/0318864 A1 Dec. 5, 2013

(51) Int. Cl.
*C10L 5/00* (2006.01)
*C10L 8/00* (2006.01)
*C10L 11/06* (2006.01)
*C10L 5/36* (2006.01)
*C10L 5/44* (2006.01)

(52) U.S. Cl.
CPC . *C10L 5/36* (2013.01); *C10L 5/368* (2013.01); *C10L 5/442* (2013.01); *Y02E 50/10* (2013.01); *Y02E 50/30* (2013.01)

(58) Field of Classification Search
CPC .......... C10L 5/36; C10L 5/442; C10L 5/368; C10L 5/34; Y02E 50/10; Y02E 50/30; F23B 20/00
USPC ............... D07/416, 417; 44/530–534
See application file for complete search history.

(56) References Cited

U.S. PATENT DOCUMENTS

| 3,269,807 | A | * | 8/1966 | Key, Jr. | 44/519 |
|---|---|---|---|---|---|
| 5,186,721 | A | * | 2/1993 | Campana | 44/519 |
| 5,364,420 | A | * | 11/1994 | Herndon | 44/542 |
| 5,967,769 | A | * | 10/1999 | Thompson | 431/288 |
| 6,080,214 | A | * | 6/2000 | Mungia | 44/530 |
| 2003/0070349 | A1 | * | 4/2003 | Thompson | 44/519 |
| 2007/0044377 | A1 | * | 3/2007 | Correa et al. | 44/540 |
| 2008/0092873 | A1 | * | 4/2008 | Chang | 126/1 R |
| 2013/0189628 | A1 | * | 7/2013 | Hidalgo et al. | 431/6 |

* cited by examiner

*Primary Examiner* — Pamela H Weiss

(57) ABSTRACT

A portable campfire, complete with everything needed to have a fire, is described. The campfire comprises wood fastened in a fixed shape on a base, kindling, and a handle for easy transport. Paper and a lighting means, such as matches can be included, along with extra kindling. The entire campfire, except for any staples or nails which are used to hold it together, will burn up, leaving only ashes behind.

15 Claims, 6 Drawing Sheets

PORTABLE CAMPFIRE

TECHNICAL FIELD

The present invention relates to campfires, and especially portable campfires. The portable campfire contains everything that is needed to start a fire and maintain it for up to one and a half hours. A handle allows the campfire to be easily transported from one location to another.

BACKGROUND OF THE INVENTION

Camping is a popular activity throughout the United States and many other parts of the world, and one of the quintessential activities of camping is sitting around a campfire. Some campers cook over their fires, while others roast marshmallows or just sit and talk. One very common way to make a campfire is to put dry paper in place, top the paper with kindling or small pieces of dry wood, then put larger pieces of wood on top. Once campers have done that, they can light the paper and, if all goes as planned, the paper will light the kindling which, in turn, will set the larger pieces of wood on fire. Over time, as the fire burns down, campers can add more wood to the fire to keep it burning.

However, in many parks, patrons are forbidden from gathering wood to burn in their fires, or there is little or no wood to be found. The stores at many campgrounds sell bundles of wood, but it is often only enough for a small fire, thus necessitating the purchase of several bundles. Often the wood in the bundles is all of a similar size, i.e., there is no kindling or small wood pieces, which are useful in getting the fire started, thus making it difficult to start the fire.

An additional difficulty in many areas of the US is that, usually due to insect infestations or disease, some areas are under quarantine, and it is not permitted to transport wood from those areas. Thus, depending on where they are coming from, campers may not be able to bring in their own firewood. It can be difficult to determine whether a quarantine exists in any given area, so campers may not be sure until they arrive at a campground whether they can bring in their own wood.

Building a campfire may be difficult and time-consuming. If the weather has been rainy or damp, it can be very difficult to find dry wood or even dry kindling to start the fire. And paper, which is often used to help start fires, may not be available.

Many products have been invented to make it easier and faster for campers or others to make and use campfires. The Portable Fused Campfire, U.S. Pat. No. 5,743,248, has a trapezoidal framework formed from wood pieces in graduated sizes, with a waterproof cover. However, this campfire uses wood which, due to quarantines, may not be able to be transported from certain areas. Similarly, the Self-Lighting Firewood Stack with Handle, U.S. Patent Application 2009/0159073, uses logs and thus users could run into issues with the wood quarantine areas with this product also. Additionally, this campfire uses wood that is all of a similar size, rather than a mix of wood sizes, and relies on an ignitable starter material cone to start the fire.

Both the Artificial Campfire disclosed in U.S. Pat. No. 6,044,836 and the Portable Artificial Campfire in U.S. Pat. No. 5,901,697 have artificial logs, a burner and a fuel source, so these are not wood-burning campfires, which is what many campers want. The Ready-to-Use Campfire disclosed in U.S. Pat. No. 5,967,769 consists of a container filled with paraffin wax, mineral spirits and hardwood chips. Although this fire has hardwood chips in it, these will burn differently from larger wood pieces. Additionally, the container does not burn up, and must be disposed of.

There are numerous portable firepits, camping stoves, and portable fireplaces but these generally don't include the wood necessary for a fire. They often are geared mainly toward cooking rather than simply for campfires.

SUMMARY OF THE INVENTION

This invention provides a portable campfire designed to allow campers and other users to have a ready-made campfire that will provide up to one and an half hours of fire. The portable campfire provides wood, kindling, paper, and matches, all packaged in such a way that the campfire is easy to light, and is self-contained. The portable campfire is easy to use. It can be made in a variety of sizes, and the smaller ones are easy to transport. In addition, since kiln-dried wood is used for the wood pieces and the kindling in the portable campfire, the portable campfire avoids the restrictions of areas where there are quarantines on bringing wood out of the area.

Due to its shape and the configuration and arrangement of the wood pieces, the portable campfire can provide a volcano effect when burning, in that sparks and flames come out the top of the portable campfire, while the sides do not initially burn.

The portable campfire can be made in a variety of sizes ranging from campfires small enough to fit inside a manufactured fire pit to custom bonfire sizes taller than a person.

BRIEF DESCRIPTION OF THE FIGURES

FIG. 1 is a front view of the invention with the hatch cover on.

DETAILED DESCRIPTION OF THE DRAWINGS

Figure 1:
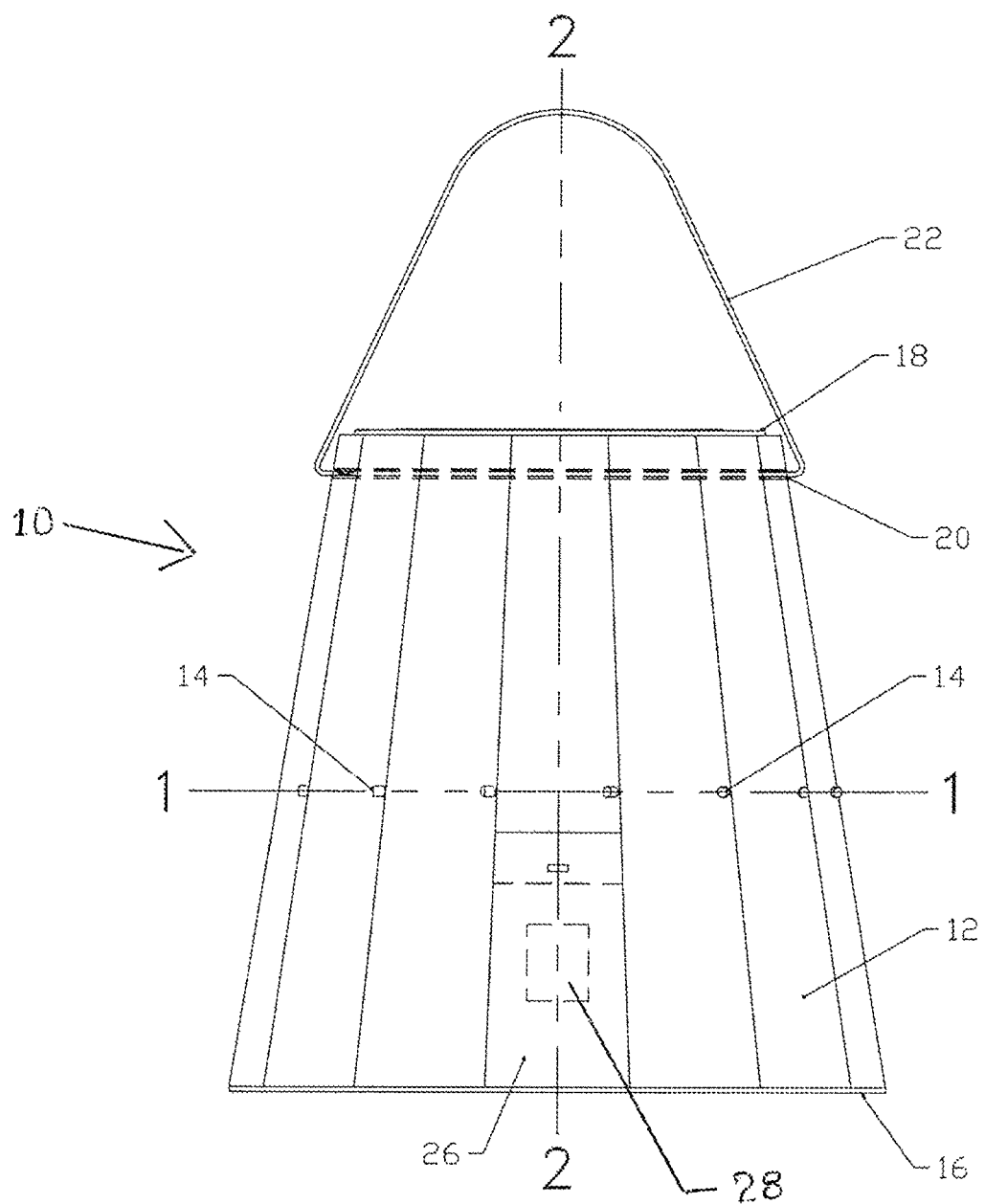

FIG. 1 shows the portable campfire of this invention, shown generally at 10. The sides of the portable campfire are made of a multiplicity of pieces of kiln-dried wood or lumber 12. In one embodiment, each wood piece has six faces: a front, a back, a first end, a second end, and two sides, while other embodiments can have different shapes of wood, such as wood with a triangular cross-section. In the embodiment shown, the front and back faces of the wood pieces have a trapezoidal shape, with the wider side of the trapezoid at the first end. The thicknesses of the wood pieces 12 can be relatively uniform, which makes the sides of the wood pieces rectangular. To assemble the portable campfire, each side of each piece of wood is each attached to the side of an adjacent piece of wood, and, in one embodiment, the first end of each piece is attached to a base 16. As shown, when assembled, the sides of the wood pieces 12 butt up against each other, with the second ends of each piece of wood adjacent to the second ends of the two pieces of wood which are on either side of it. Thus, when the pieces of wood 12 are butted up against one another, they form a shape like a truncated cone or frustrum, with the end of the frustrum to which the first ends of the pieces of wood 12 are attached being wider than the other end of the frustrum.

Figure 6:
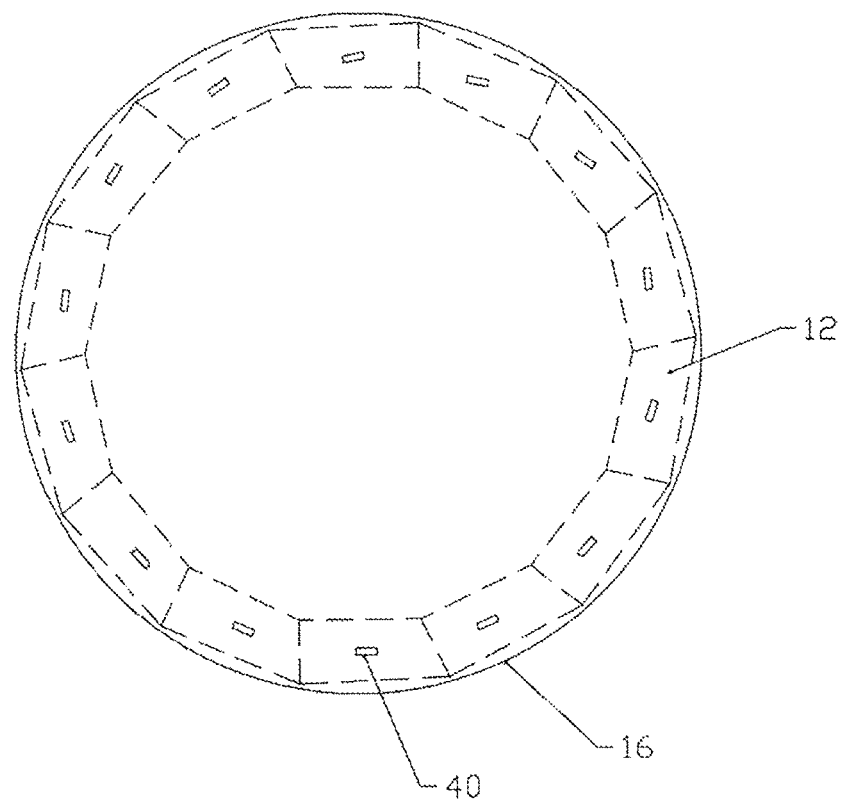
FIG. 6 is a bottom view of the invention.

In one embodiment, all the pieces of wood 12 are of relatively the same length. In this embodiment, the first ends of the wood pieces 12 are attached to a base 16 made of a flammable material such as cardboard, layers of paper or a piece of wood. For a smaller sized portable campfire, the piece of wood would be thin in relation to the pieces of wood which make up the sides, but for a larger portable campfire, the base could be a thicker piece of wood. Attachment means such as staples, nails, tacks, dowels or glue can be used to attach the wood pieces 12 to the base 16 as shown in FIG. 6. As shown, the base 16 is circular, although it can also be in other shapes, such as an octagon, a pentagon, or a square. In another embodiment, one piece 15 of wood will not be uniform in shape or, as shown, will be shorter than the other pieces of wood.

Figure 2:
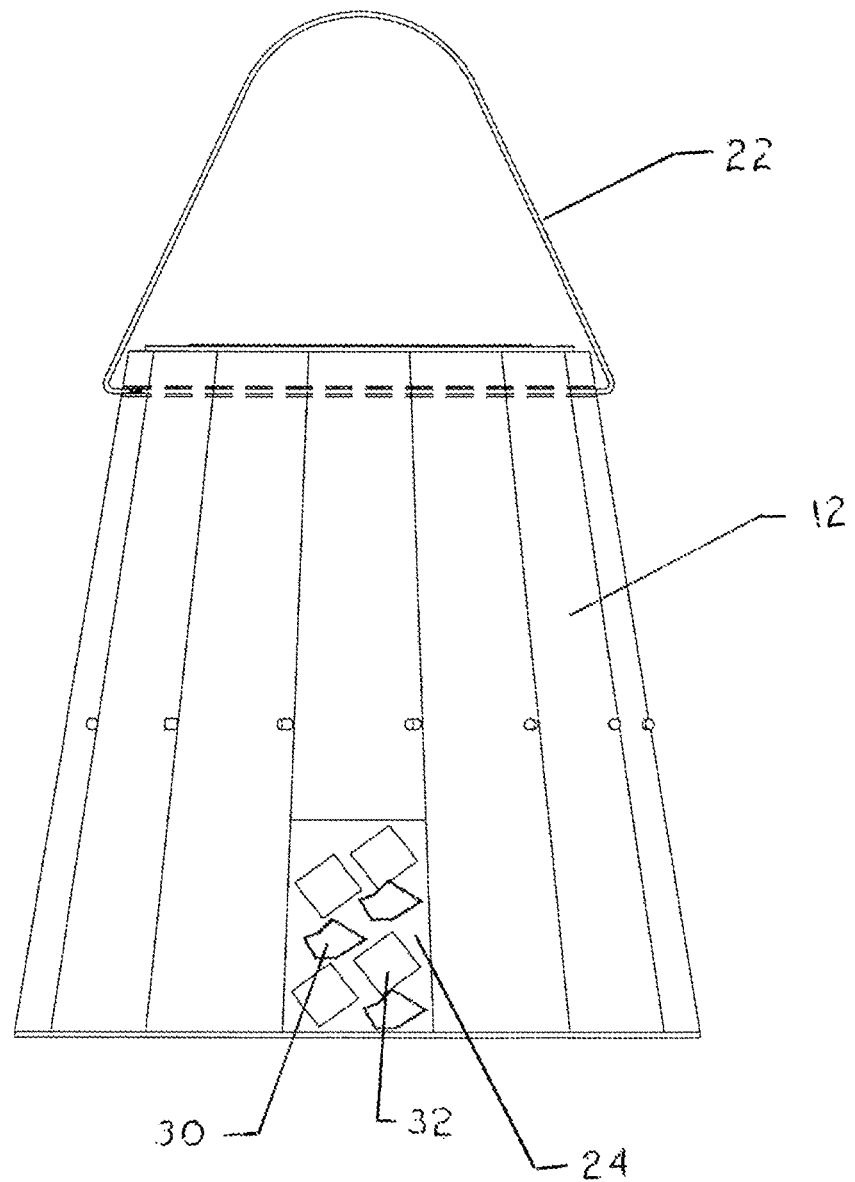
FIG. 2 is a front view of the invention with the hatch cover off.

In the embodiment shown, the shorter wood piece is attached to the adjacent wood pieces at the second end of the wood pieces, thus leaving an opening 24 at the base of the campfire. In an alternative embodiment, a piece of wood can have a section removed from it near the first end so that, when the wood pieces are attached to one another or to the base, the cut-out section defines an opening 24. As shown in FIG. 2, this opening 24 extends from the exterior to the interior of the portable campfire.

Figure 4:
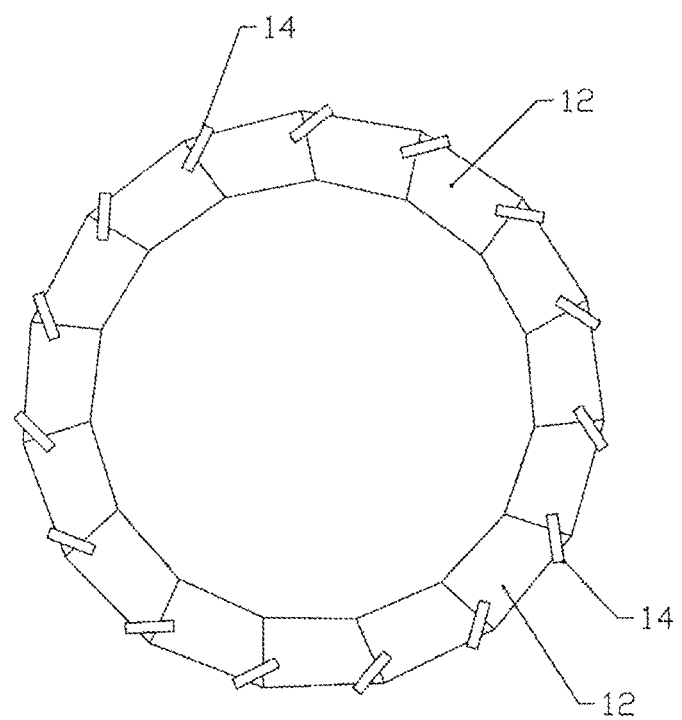
FIG. 4 is a cross-sectional view of the invention as viewed from line 1-1 in FIG. 1, without paper or wood inside the campfire.

In one embodiment, each piece of wood defines holes which are of a size that dowels can fit snugly into the holds. As seen in FIG. 4, the holes in adjacent pieces of wood are lined up in such a way that a single dowel 14 can be inserted through holes in two adjacent pieces of wood when the pieces of wood are in the appropriate position in the finished campfire. The dowels are positioned in such a manner that each dowel 14 extends partially through two pieces of wood 12. The dowels 14 fit snugly in the holes, and thus the hold the wood pieces 12 in place. In other embodiments, the wood pieces can be held together with nails, staples or glue.

In one embodiment, two of the wood pieces 12, spaced roughly equidistant from one another radially, define holes 20 near their second ends. A cord 22 is threaded through the holes 20 defined by the wood pieces 12. The ends of the cord are fastened together. The fastening means can be tying the ends in a knot, or fastening the ends to one another with a metal or wire band, a length of string or some other attachment means. The cord can thus function as a handle for the portable campfire. The handle can allow the user to easily move the portable campfire from one place to another prior to lighting it. In other embodiments, three or more pieces of wood can define holes that a cord 22 is threaded through to give added stability when carrying the campfire. Alternatively, the portable campfire may not have a handle.

Material that is easily removed, such as paper, fabric, cardboard or a thin piece of wood, can be attached to the side of the portable campfire in such a manner as to cover the opening 24, thus creating a hatch cover 26. In order to light the portable campfire, the hatch cover 26 is removed, and the fire is lit through the opening. The easily removable material is attached via staples, glue, nails or tacks (not shown). The easily removed material of the hatch cover 26 can be of a flammable material that can be inserted into the portable campfire prior to lighting it.

A match or matches or a matchbook 28 or other tool for starting a fire such as a lighter, is attached to the hatch cover 26. In the embodiment shown, matches are attached on the side of the hatch cover that faces the interior of the portable campfire, although the match or matches or other igniting material can be attached to the outside of the campfire.

Figure 3:
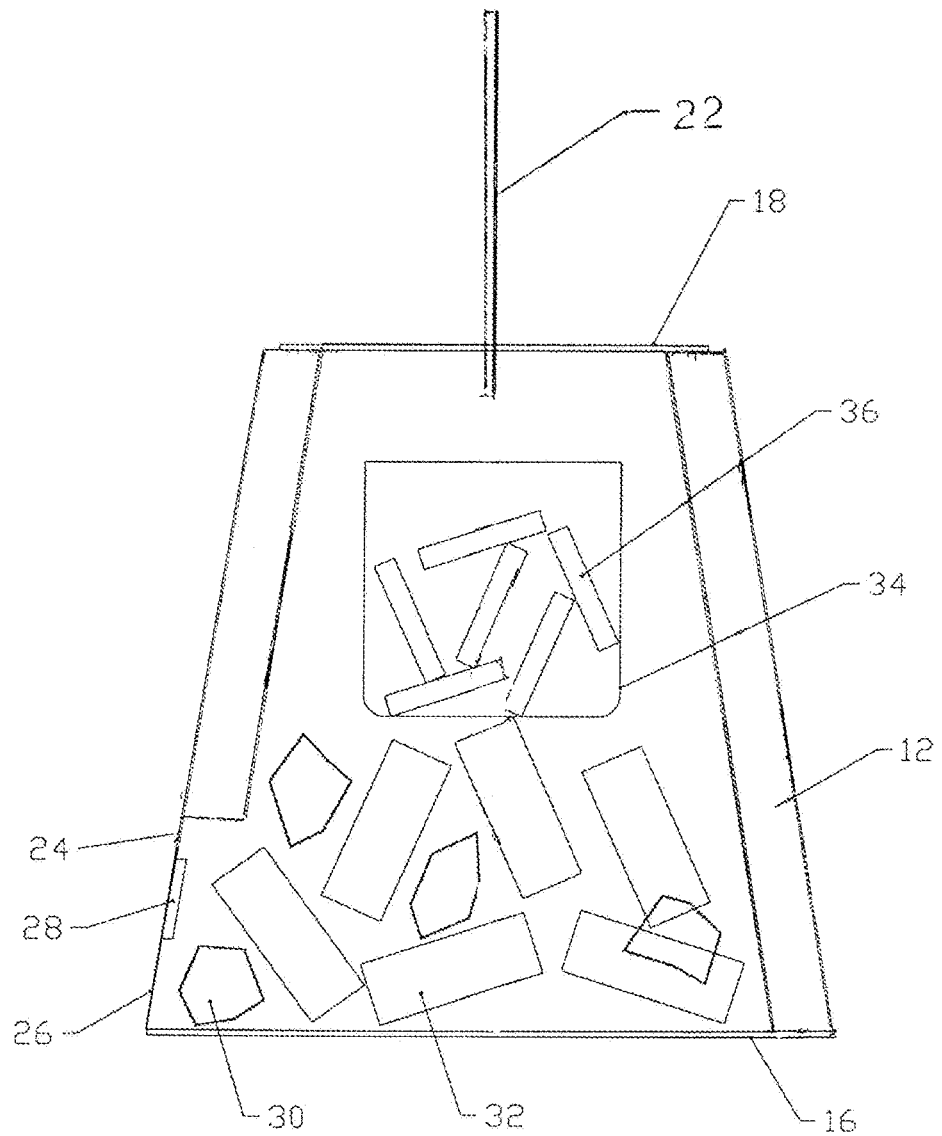
FIG. 3 is a cross-sectional view of the invention as viewed from line 2-2 in FIG. 1.

As shown in FIG. 3, inside the portable campfire are bits of paper 30 and wood 32 in various sizes. These can be lit when starting the fire, especially the paper 30, which will remain lit for long enough to start the pieces of wood 32 burning which, in turn, will start the pieces of wood 12 on fire. There can also be a removable container 34 containing more pieces of wood 36. The container can be of paper or a flammable fabric such that the container can be inserted into the portable campfire and burned after it is no longer needed. The wood in the container can be added to the fire after it has started burning and as it continues to burn to prolong its life.

As seen in FIG. 4, the wood pieces 12 are cut so they fit together fairly snugly. In the embodiment shown, the front, back, and one side of the wood pieces 12 meet each other at roughly right angles, while the second side is cut at an angle. The angle is such that the wood will fit fairly snugly to the adjacent wood pieces when the campfire is assembled. Alternatively, the wood pieces 12 could have the front and back roughly parallel to one another while both the two sides are at angles to the front and back. Having the sides of the wood pieces 12 abut one another creates a temporary "volcano" effect when the portable campfire burns, as it prevents most sparks and flames from escaping through the sides of the portable campfire, but rather forces more sparks and flames to exit through the top of the campfire.

In another alternative embodiment, wood pieces 12 have a rectangular cross-section, and the wood pieces 12 abut one another at the interior corners of the rectangles. However, this arrangement of the wood pieces 12 would potentially allow more sparks to escape, thus reducing the volcano effect of the portable campfire. In yet another alternative embodiment, the wood pieces 12 have a triangular cross-section, with the triangles of such a configuration that when attached to one another, the wood pieces 12 form the shape of a frustrum, particularly a circular frustrum, where the two ends of the campfire are circular.

Figure 5:
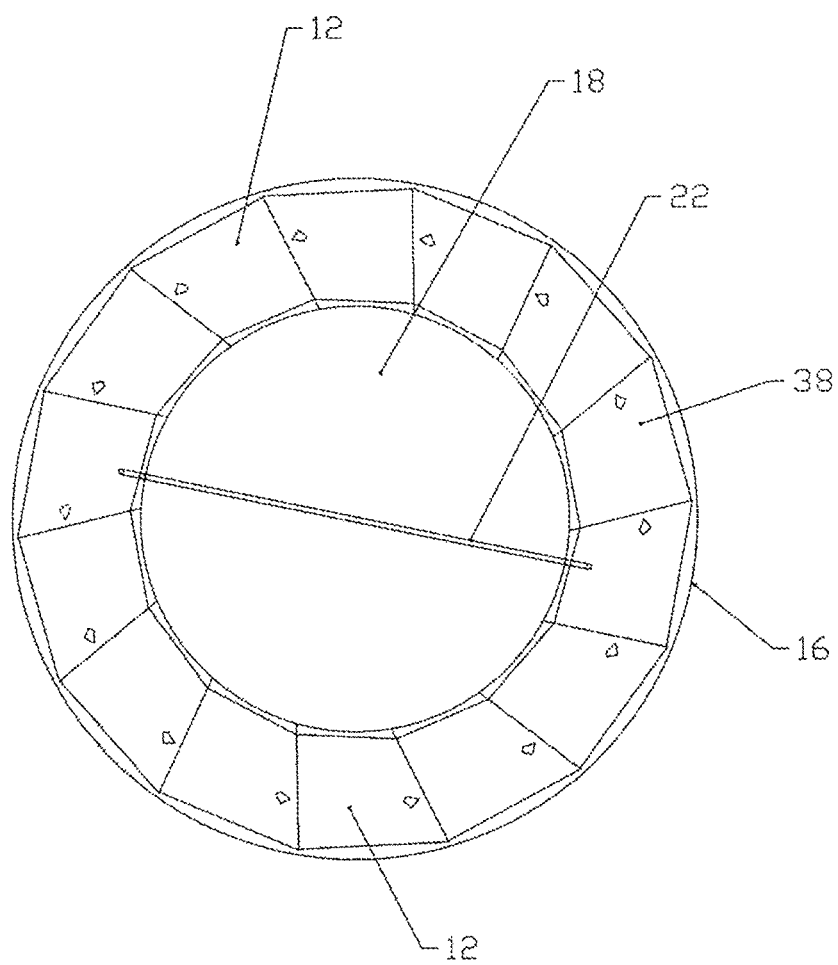
FIG. 5 is a top view of the invention.

As shown in FIG. 5, the second ends of the wood pieces 12 are attached to a cap 18 made of a combustible material. The means of attachment can be nails, staples, tacks, dowels, glue or other suitable attachment means. The cap 18 can be circular, as shown, or it can be in another shape, such as an octagon, a pentagon or a square. The cap can be removed prior to lighting the portable campfire to allow the fire to draft, and to allow the flames and sparks to be released. Removal of the cap 18 also allows the removal of the removable container and the wood contained in it, so the wood can be added to the fire later.

FIG. 6 shows the base 16 of the campfire attached to the pieces of wood 12. The pieces of wood ban be attached to the base with a variety of attachment means 40, such as staples, nails, tacks or glue.

What is claimed is:

1. A portable campfire which comprises:
   sides made of a multiplicity pieces of wood, of which each piece has a front, a back, two sides, a first end and a second end,
   a cap, having a width, made of a flammable material, and
   a base, having a width, made of a flammable material, wherein
   the first ends of at least some of the multiplicity of pieces of wood are attached to the base,
   wherein at least part of both sides of each piece of wood are each adjacent to at least part of one side of another piece of wood;
   wherein the pieces of wood are wider at the first ends than at the second ends;

wherein the second ends of each of the pieces of wood are attached to the cap; and wherein one of the pieces of wood is shorter than the other pieces of wood, and where the second end of the shorter piece of wood, and where the second end of the shorter piece of wood is attached to the second ends of the adjacent pieces of wood, thus creating an opening in the side of the portable campfire between the first end of the shorter piece of wood and the base; and wherein the width of the base is larger than the width of the cap.

2. A portable campfire which comprises:
sides made of a multiplicity of pieces of wood, each of which has a first end and a second end, three sides, and
a base made of a flammable material, wherein
the first ends of a multiplicity of the pieces of wood are attached to the base,
each of the multiplicity of pieces has a triangular cross-section, and
wherein at least part of two of the sides of each of the pieces of wood are adjacent to sides of adjacent pieces of wood.

3. The invention as claimed in claim 1 in which the pieces of wood are kiln-dried lumber.

4. The invention as claimed in claim 1 in which the wood pieces are configured in such a way that, when in place as assembled, the sides of a multiplicity of adjacent pieces of wood butt up against each other.

5. The invention as claimed in claim 1 in which adjacent pieces of wood are attached to one another by attachment means.

6. The invention as claimed in claim 5 in which the attachment means is at least one dowel that fits into holes that are defined in two adjacent pieces of wood in such a way that the holes line up with one another to allow the at least one dowel to hold the two pieces of wood in place in relation to one another.

7. The invention as claimed in claim 5 in which the attachment means is chosen from the group that includes nails, staples, tacks, wood pegs, and glue.

8. The invention as claimed in claim 1 in which wood pieces in the portable campfire, when assembled, form the shape of a frustrum wherein the end of the frustrum at the first ends of the pieces of wood is wider than the end of the frustrum at the second ends of the pieces of wood.

9. The invention as claimed in claim 1 in which the base is circular in shape.

10. The invention as claimed in claim 1 in which a multiplicity of the pieces of wood in the portable campfire, which multiplicity of pieces are spaced equidistant from one another when in place, define holes toward the second ends of the pieces of wood, and wherein a cord with two ends extends through the holes defined by the wood pieces, and where the ends of the cord are attached to one another.

11. The invention as claimed in claim 1 in which the cap is removable.

12. The invention as claimed in claim 1 in which a removable material is attached by attachment means to cover the opening in the side of the portable campfire.

13. The invention as claimed in claim 1 in which a tool for lighting a fire is attached to the portable campfire.

14. The invention as claimed in claim 1 in which flammable material is inside the portable campfire.

15. The invention as claimed in claim 1 in which a separate, removable package containing pieces of wood is placed inside the portable campfire.

* * * * *